Nov. 15, 1966 W. F. JACKSON ET AL 3,286,216
ELECTRIC TERMINAL
Original Filed June 11, 1963

INVENTORS
WILBUR F. JACKSON
HENRY C. BRAUCKSIEK

BY Anthony H. O'Brien
ATTORNEY

3,286,216
ELECTRIC TERMINAL

Wilbur F. Jackson, Rolling Hills, and Henry C. Braucksiek, Buena Park, Calif., assignors to Robertshaw Controls Company, Richmond, Va., a corporation of Delaware
Original application June 11, 1963, Ser. No. 287,061. Divided and this application Oct. 23, 1965, Ser. No. 502,990
6 Claims. (Cl. 339—89)

This application is a division of our copending application Serial No. 287,061 filed June 11, 1963.

This invention relates to electrical terminals and, in particular, to such a terminal to be compressed between spaced conductors.

In gas burning appliances, it is conventional practice to provide a thermostatic control for normal thermostatic cycling of the gas burner as well as an automatic safety shut-off control for shutting off all gas flow in the event the pilot gas flame is extinguished. Such an automatic shut-off control includes a thermoelectric magnet held in its energized position by thermoelectric current generated by a thermocouple disposed in the flame of the pilot gas burner.

As is disclosed and claimed in the above copending application, a high limit switch is integrally assembled with the normal thermostatic control and is electrically connected into the thermoelectric circuit for the holding magnet.

An object of the present invention is to provide an electrical terminal for connecting switch leads between spaced electrical conductors.

Other objects and advantages of the present invention will become apparent from the following description taken in connection with the accompanying drawing wherein.

Figure 1:
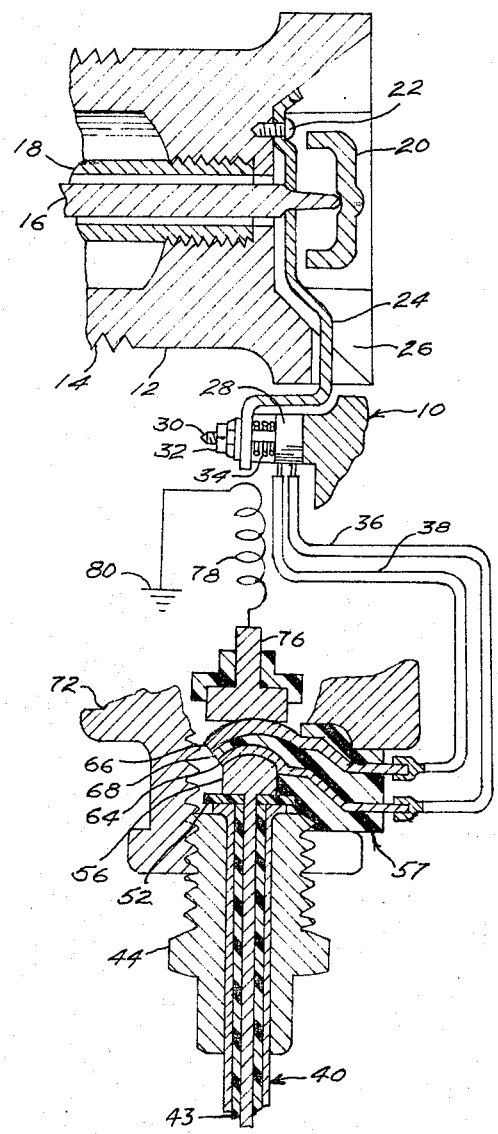
FIG. 1 is a partial, longitudinal cross-section of a thermostatic control device embodying the present invention.

As is illustrated in FIG. 1, a preferred embodiment of the present invention is included with a thermostatic control device, indicated generally at 10, which thermostatically controls gas flow to gas burner apparatus as fully disclosed in the above copending application. For the sake of brevity, only those elements of the control device 10 which are necessary to understand the present invention, are repeated in this application. For instance, the control device 10 includes a mounting shank 12 with exterior threads 14 for fastening to a gas burning appliance, such as a hot water heater. A thermostat in the form of a rod 16 and tube 18 is carried by the shank 12; the tube 18 is made of thermally expandable material, such as copper, and the rod 16 is made of relatively non-expandable material, such as invar. The free end of the rod 16 has a reduced portion which engages an operating lever 20 for thermostatically cycling the control device 10. A set screw 22 secures one end of a spring arm 24 to the mounting shank 12; the reduced end portion of the rod 16 extends through a suitable aperture in the spring arm 24 which is normally biased against the shoulder defining the reduced end portion.

The free end of spring arm 24 extends through an opening 26 in the mounting shank 12 to operate the switch 28. The spring arm 24 is retained on the switch arm 30 by a threaded nut 32 against which it is biased by a coil spring 34. A pair of leads 36 and 38 extend from the switch 28 and define means whereby a thermocouple, indicated generally at 40, is connected in series with the switch 28.

Figure 2:
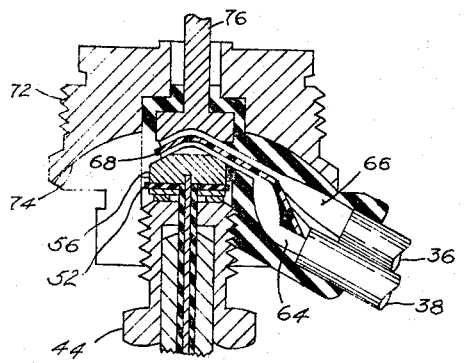
FIG. 2 is a partial cross-section of a detail of FIG. 1, showing an electrical junction assembled between the electromagnet terminal and the thermocouple connection.
Figure 3:
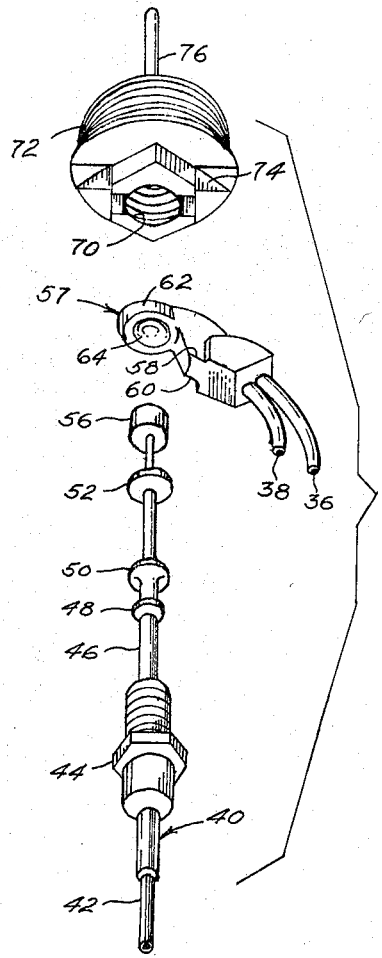
FIG. 3 is an exploded perspective view of FIG. 2 illustrating the electrical terminal used in combination with a portion of the electromagnet element and the thermocouple assembly.

As is illustrated in FIGURE 3, thermocouple 40 is of standard construction having a lead 42 and adaptor nut 44 and formed in part as a tubing 46 terminating in a flanged portion 50. Lead 42 has an insulation material 43 formed around its periphery to prevent shorting with the tubing 46, and is contained therein. Lead 42 terminates in a head portion 56 which is fixedly attached thereto, an insulating washer 52 is interposed between the head portion 56 and the flange portion 50, and a lock washer 48 is placed under flange portion 50.

A feature of the present invention includes an electrical terminal 57 which may be inserted between the thermocouple head portion 56 and the seat of the magnet frame conductor. The electrical terminal 57 includes the insulated electrical conductors or leads 36 and 38, attached to opposite sides of the switch 28 as schematically illustrated in FIGURE 1. A threaded plug 72 has a slot 74 cut centrally therethrough and this slot receives the molded terminal body 57. Terminal body 57 has lands 58 and 60 thereon which are slightly smaller in width than the plug slot 74 and also has a cylindrical head portion 62 which is slightly smaller in diameter than the threaded bore 70 within the plug 72 which facilitates assembly of the entire device.

The leads 36 and 38 are disposed on a longitudinal axis that extends into the terminal body wherein such leads are deformed in part at their extremities 64 and 66, respectively, into flattened shapes that are substantially parallel with the longitudinal axis. In the preferred embodiment, the extremity of the conductors have a conical shape which mate with the head portion 56 and seat of conductor 76, thus aiding good electrical contact. A strip of insulating material 68 is placed between the deformed extremities to prevent accidental shorting of the lead wires 36 and 38.

Preferably the terminal body 57 is made from a molded material such that the body might completely surround the insulated leads 36 and 38, contained within it. By surrounding the periphery of the deformed portions of the terminal leads, the cylindrically formed portion 62 is used to protect the ends of the leads 36 and 38 and to prevent accidental grounding of the leads against adjacent components. The terminal body 57 leaves a portion of each deformed extremity 64 and 66 uncovered so that the head portion 56 and the seat of conductor 76 may contact the deformed portion of the leads 36 and 38.

Inasmuch as the preferred embodiment of the present invention is subject to many variations and changes in details, it is intended that all matter contained in the foregoing description or shown on the accompanying drawing, shall be interpreted as illustrative and not in a limiting sense.

We claim:
1. An electrical terminal comprising:
    a plurality of electrical conductors disposed on a longitudinal axis,
    at least one of said conductors being deformed at its extremity in a flattened shape substantially parallel with the longitudinal axis,
    all of said conductors formed with a generally cone-shaped deformed portion and nested within each other,
    an insulator physically joining said plurality of conductors and extending to separate the conductor extremities to prevent contact between conductors,
    said insulator extending around the periphery of the deformed area of the conductor, and
    a strip of insulation material positioned between the conductor extremities to prevent contact between the conductors.

2. An electrical terminal comprising
a pair of electrical leads disposed in spaced relation to each other, each of said leads having a connecting part and a contact part,
insulation means disposed between said pair of leads to prevent electrical contact therebetween,
body means of insulating material having first and second portions,
the first portion of said body means enclosing the connecting parts of said leads,
the second portion of said body means defining a head portion receiving the contact parts of said leads,
said head portion having a pair of oppositely disposed end members, and
recess opening means extending into each end member and exposing said contact parts whereby each contact part defines a deformable portion adapted for connection to an electrical conductor.

3. The combination as recited in claim 2 wherein said contact parts have conical shapes, and said head portion has a cylindrical shape surrounding peripheral edges of said conical shapes.

4. An electrical terminal assembly comprising
a plug element having a through bore and conductor means therein
means defining a slot extending through a wall of said plug element and communicating with said bore,
a body member of insulating material having a head portion disposed in said bore and a portion disposed in said slot,
a pair of electrical leads disposed in spaced relation to each other in said body member,
insulation means disposed between said leads to prevent electrical contact therebetwen,
said electrical leads having contact parts disposed in the head portion of said body member, and
recess opening means on opposite sides of said head portion exposing said contact parts therein in alignment with said bore whereby said conductor means may be pressed into electrical contact therewith.

5. The combination as recited in claim 4 wherein said head portion surrounds peripheral edge portions of each contact part to prevent electrical contact with said plug element.

6. The combination as recited in claim 2 wherein said first and second portions of said body means are joined as an integral unit.

References Cited by the Examiner

UNITED STATES PATENTS

| | | | |
|---|---|---|---|
| 2,055,114 | 9/1936 | Woernley | 339—218 X |
| 2,201,045 | 5/1940 | Lundstrom | 339—28 |
| 2,654,873 | 10/1953 | Swengel | 339—277 X |
| 2,755,452 | 7/1956 | Rogie | 339—176 X |
| 2,994,059 | 7/1961 | Dahlgren et al. | 339—17 X |
| 3,017,615 | 1/1962 | Smith et al. | 339—218 X |
| 3,177,458 | 4/1965 | Buchanan | 339—218 X |
| 3,219,923 | 11/1965 | Hess | 339—176 X |

EDWARD C. ALLEN, *Primary Examiner.*

W. DONALD MILLER, *Examiner.*